(12) United States Patent
Marasigan (10) Patent No.: US 11,294,381 B2
(45) Date of Patent: Apr. 5, 2022

(54) VEHICLE MOTION ADAPTATION SYSTEMS AND METHODS

(71) Applicant: Toyota Motor North America, Inc., Plano, TX (US)

(72) Inventor: Joshua V. Marasigan, Carrollton, TX (US)

(73) Assignee: Toyota Motor North America, Inc., Plano, TX (US)

(*) Notice: Subject to any disclaimer, the term of this patent is extended or adjusted under 35 U.S.C. 154(b) by 438 days.

(21) Appl. No.: 16/198,440

(22) Filed: Nov. 21, 2018

(65) Prior Publication Data

US 2020/0159230 A1 May 21, 2020

(51) Int. Cl.
| | | |
|---|---|---|
| *G05D 1/02* | (2020.01) | |
| *G05D 1/00* | (2006.01) | |
| *G06N 20/00* | (2019.01) | |
| *G08G 1/16* | (2006.01) | |
| *G08G 1/052* | (2006.01) | |
| *H04W 4/44* | (2018.01) | |

(52) U.S. Cl.
CPC ......... *G05D 1/0214* (2013.01); *G05D 1/0088* (2013.01); *G06N 20/00* (2019.01); *G08G 1/052* (2013.01); *G08G 1/164* (2013.01); *H04W 4/44* (2018.02)

(58) Field of Classification Search
CPC .... G05D 1/0214; G05D 1/0088; G06N 20/00; G08G 1/164; G08G 1/052; H04W 4/44
See application file for complete search history.

(56) References Cited

U.S. PATENT DOCUMENTS

| | | | |
|---|---|---|---|
| 7,042,345 | B2 | 5/2006 | Ellis |
| 7,085,637 | B2 | 8/2006 | Breed et al. |
| 9,632,502 | B1 | 4/2017 | Levinson et al. |
| 9,868,393 | B2 | 1/2018 | Bahgat et al. |
| 10,012,993 | B1 | 7/2018 | Matus et al. |
| 2017/0174261 | A1 | 6/2017 | Micks et al. |
| 2019/0225213 | A1* | 7/2019 | Heinecke .......... B60W 30/0956 |
| 2019/0317513 | A1* | 10/2019 | Zhang ...................... G06N 3/08 |
| 2019/0391587 | A1* | 12/2019 | Uvarov ................ G06K 9/4628 |
| 2020/0269867 | A1* | 8/2020 | Hua ...................... B60W 40/09 |

OTHER PUBLICATIONS

David Stavens, Gabriel Hoffmann, and Sebastian Thrun; Online Speed Adaptation using Supervised Learning for High-Speed, Off-Road Autonomous Driving; Stanford Artificial Intelligence Laboratory (URL: http://robots.standford,edu/papers/stavens_hoffman_thrun.ijcai07.pdf)(accessed Aug. 24, 2018)(7 pages).

* cited by examiner

*Primary Examiner* — Navid Ziaeianmehdizadeh
(74) *Attorney, Agent, or Firm* — Dinsmore & Shohl LLP (57) ABSTRACT

A vehicle motion adaptation system includes a processor and a memory coupled to the processor and storing a machine learning program. The machine learning program, upon execution by the processor, performs at least the following operations of (i) determining a selective set of data points to be stored on board, (ii) storing the selected set of data points based on the determination, (iii) determining a learned response to one or more driving events based on the selected set of data points stored onboard, and (iv) adapting a motion of a vehicle based on the learned response.

14 Claims, 8 Drawing Sheets

VEHICLE MOTION ADAPTATION SYSTEMS AND METHODS

TECHNICAL FIELD

Embodiments described herein generally relate to vehicle motion adaptation systems and methods, and more specifically, vehicle motion adaptation systems and methods adapted to adjust or change a motion of a vehicle based on vehicle data stored on board in order to provide an instant and learned vehicle response to various driving events.

BACKGROUND

Data volume generated and transmitted by vehicles are on the rise drastically. At this point, some vehicles already produce a large volume of data that is uploaded to a cloud (e.g., every minute). Continuous transmission of data may not provide an option of selecting better data transmission settings, such as transmitting data during a less crowded time, when signal strength is favorable, etc. Data transfer between vehicles and the cloud has already resulted in high expenses and such expenses will likely further rise as data transfer volume continues to rise. Moreover, transmission of data may not consider any potential risk of losing data when the transmission settings are poor and/or the signal strength is not favorable.

In addition to expenses and risks associated with vehicle data transmission, data transfer bandwidth or capacity is a limited resource. It is important to optimize use of the bandwidth in order to avoid transmission interruption and outage. Transmission interruption and outage may have significant impact on many businesses, vehicles, hospitals, emergency situations, and daily lives of many people. Therefore, there is a good reason to store vehicle data on board instead of continuously transmitting to a cloud without a proper filtering process.

On board stored vehicle data may be used to provide many advantages. Vehicle drivers may encounter emergency situations while driving vehicles. More specifically, vehicles may experience crashes, pedestrians jumping into roads, animals crossing roads and crashing into vehicles, objects falling from nearby vehicles, etc. These emergency situations may be unpredictable and take place in a very short time. Vehicles may need to react to these situations and immediately take an appropriate action in order to avoid crashes or injury. For instance, three seconds may not be fast enough to stop a car in order to avoid a child jumping into the street. A vehicle computing system may be able to provide a fast response by using the on board stored vehicle data.

In addition to a fast response, it may be desirable for vehicle responses to reflect the actual environments of various driving events in order to improve a confidence level of such responses. For instance, if only a fast response may be factored into a determination of a vehicle response to emergency situations, then a vehicle may stop immediately upon detection of an object positioned far away from a vehicle. Such vehicle response may not only fail to reflect the actual driving events but also cause confusion on a vehicle driver and drivers of surrounding vehicles. Vehicle data that have been collected and stored on board may provide multiple reference data points to provide a response that reflects an actual driving event and the motion of a vehicle may take place based on the response that reflects the actual driving event.

Accordingly, there is a need to provide vehicle motion adaptation systems and methods for selectively storing data points on board and providing an instant and learned response to various driving events by using the stored data points. There is also a need to provide vehicle motion adaptation systems and methods for adapting the motion of a vehicle based on the instant and learned response.

SUMMARY

In one embodiment, a vehicle motion adaptation system includes a processor and a memory coupled to the processor and storing a machine learning program. The machine learning program, upon execution by the processor, performs at least the following operations of (i) determining a selective set of data points to be stored on board, (ii) storing the selected set of data points based on the determination, (iii) determining a learned response to one or more driving events based on the selected set of data points stored onboard, and (iv) adapting a motion of a vehicle based on the learned response.

In another embodiment, a vehicle motion adaptation system includes one or more sensors mounted in or around a vehicle, a processor coupled to the sensors and operable to receive one or more data streams, and a memory coupled to the processor and storing information indicative of one or more predetermined motions of the vehicle associated with one or more driving events. The vehicle motion adaptation system further includes machine readable instructions stored in the memory and upon execution by the processor, performing at least the following operations including (i) storing the one or more data streams locally, (ii) identifying a selected driving event based on the one or more data streams, (iii) determining an initial motion correlated to the selected driving event by accessing the one or more predetermined motions of the vehicle, (iv) determining a learned response to the selected driving event based on the one or more data streams, and (v) adapting a motion of a vehicle based on the learned response with respect to the selected driving event.

In another embodiment, a vehicle motion adaptation method includes the steps of (i) determining, with a processor, a selective set of data points to be stored on board, (ii) storing the selected set of data points based on the determination, (iii) identifying, with the processor, a selected driving event based on the selective set of data points, (iv) determining an initial motion correlated to the selected driving event by accessing one or more predetermined motions of the vehicle stored in a memory, (v) determining a learned response to one or more driving events based on the selected set of data points stored onboard, and (vi) adapting a motion of a vehicle based on the learned response.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Connected cars are equipped to communicate with other devices, utilizing connectivity available via wireless and/or cellular networks. Connected cars may be connected to and communicate with the surroundings. Connected cars may communicate via a variety of communication models, including Vehicle to Infrastructure ("V2I"), Vehicle to Vehicle ("V2V"), Vehicle to Cloud ("V2C"), and Vehicle to Everything ("V2X") communication models. A V2I communication model facilitates the communication between a vehicle and one or more infrastructure devices, which may enable the exchange of data generated by a vehicle and information about the infrastructure. A V2V communication model facilitates the communication between vehicles and may allow for the exchange of data generated by surrounding vehicles, including speed and position information of surrounding vehicles. A V2C communication model facilitates the exchange of information between a vehicle and a cloud system. A V2X communication model interconnects all types of vehicles and infrastructure systems with another.

As discussed above, connected cars operate to capture and generate a large amount of data about a vehicle, surrounding vehicles, the environment, etc. Connected cars may seamlessly transmit such data to surrounding vehicles, a cloud server, other infrastructure, etc. and communicate with them via the network. The embodiments of vehicle motion adaptation processing systems and methods may include connected cars. The embodiments disclosed herein include vehicle motion adaptation systems and methods that may handle a large amount of data generated by various components such as vehicle sensors. The vehicle motion adaptation systems and methods may store a selected set of vehicle data on board, instead of transmitting it to a cloud system. The vehicle motion adaptation systems and methods may identify a driving event and determine an initial response to the driving event. In some embodiments, the initial response may be associated with the driving event by pre-storing such association in a memory.

Once the initial response is determined, the vehicle motion adaptation systems and methods may determine a learned response based on a subsequent set of vehicle data obtained after the initial response is made. For instance, vehicle data may indicate speeding of a vehicle and a subsequent set of vehicle data may confirm speeding of a vehicle beyond a speed limit. The vehicle motion adaptation systems and methods may be adapted to adjust or change a motion of a vehicle based on vehicle data stored on board in order to provide an instant and learned vehicle response to various driving events. If the initial response and the learned response indicate speeding, the vehicle motion adaptation systems and methods may control a motion of the vehicle to reduce driving speed by a certain level.

In the embodiments disclosed herein, the vehicle motion adaptation systems and methods may include a processor and a machine learning program, and an onboard storage device, where the machine learning program, upon execution by the processor, performs determining a selective set of data points to be stored onboard based on one or more criteria, storing the selected set of data points onboard in response to the determination, and determining a learned response with respect to a driving event based on the selected set of data points stored onboard. The various vehicle motion adaptation systems and methods will be described in more detail herein with specific reference to the corresponding drawings.

In the embodiments disclosed herein, the vehicle motion adaptation systems and methods include a processor that determines responses correlated to driving events stored in a memory and retrieves an initial response correlated to a particular driving event. Then the motion of the vehicle is controlled based on the initial response. In some embodiments involving autonomous vehicles, the control of the motion of the vehicle may be performed directly by the processor and a control mechanism. Alternatively, or additionally, the processor is operable to control a display device to display a relevant warning or notification reflecting the initial response. Then drivers may see the warning or notification and take necessary actions to control the motion of the vehicle accordingly.

Figure 1:
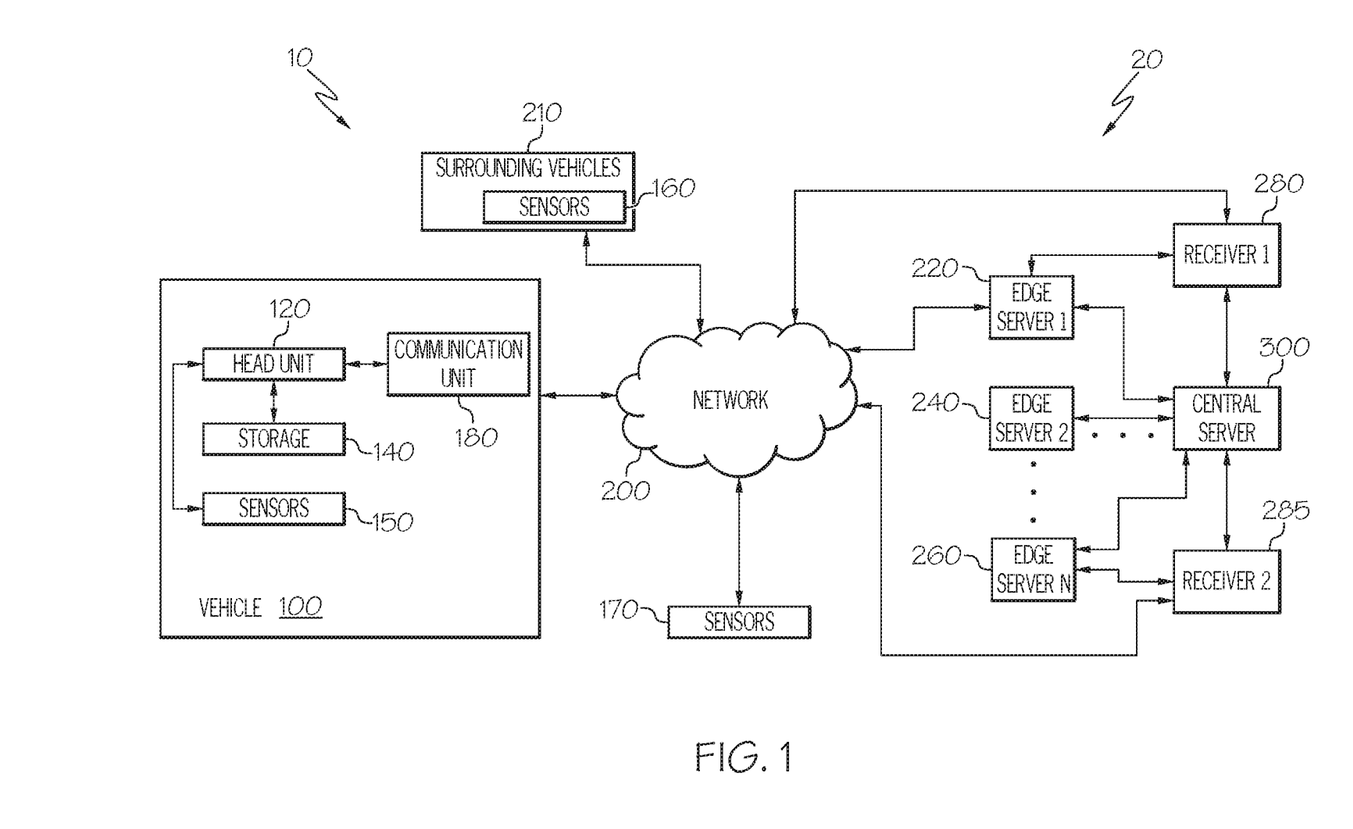
FIG. 1 schematically depicts a connected cars system according to one or more embodiments shown and described herein.

FIG. 1 schematically depicts a connected cars system 10 including a vehicle 100 and a cloud computing system 20. The vehicle 100 includes a head unit 120, storage 140 and various sensors 150. The head unit 120 controls operation of the vehicle 100 based on data points captured and sent from the sensors 150. The storage 140 is coupled to the head unit 120 and stores a set of data points under the control of the head unit 120. The sensors 150 include various types of sensors used in the vehicle 100. In some embodiments, the sensors 150 include one or more cameras, an accelerometer, a proximity sensor, a braking sensor, a motion sensor, etc. However, the sensors 150 used in the vehicle 100 are not limited thereto.

In some embodiments, the vehicle 100 also receives data points from other sensors 170 which may be arranged outside of the vehicle 100. For example, the sensors 170 may be arranged with buildings such as a parking structure, municipal infrastructure, the surroundings of the vehicle 100, etc. The vehicle 100 may receive data points from the sensors 170 via the network 200. Alternatively, or additionally, a cloud server may receive data from the sensors 170. The network 200 may include cellular network, WiFi network, near field network, or any other available communication network. In other embodiments, the vehicle 100 may receive the data points from surrounding vehicles 210 via a V2V communication channel. Like the sensors 150, various types of sensors such as one or more cameras, an accelerometer, a proximity sensor, a braking sensor, a motion sensor, etc. may be used as the sensors 170.

As shown in FIG. 1, the vehicle 100 includes a communication unit 180 that exchanges data and information between the vehicle 100 and a network 200. As shown in FIG. 1, the vehicle 100 may be connected and communicate with one or more edge servers 220, 240 and 260. The edge servers 220, 240 and 260 may be connected and communicate with a central server 300. The central server 300 may be in communication with receivers 280, 285. Receivers 280 and 285 such as Receiver 1 and Receiver 2 may connect vehicles with the central server 300 as an intermediary.

The central server 300 may represent a cloud server run by commercial network carriers, or a cloud server by some entities, such as a municipality, to operate as a node. For instance, a particular city may run a cloud server as a node to receive reports relating to road conditions such as pot holes from vehicles. In some embodiments, edge servers 1, 2 . . . N (220, 240, . . . 260) may represent such cloud nodes for various purposes run by various entities and the central server 300 may be a server behind those nodes, including the necessary logic to run those nodes and the overall vehicle data offloading systems.

Figure 2:
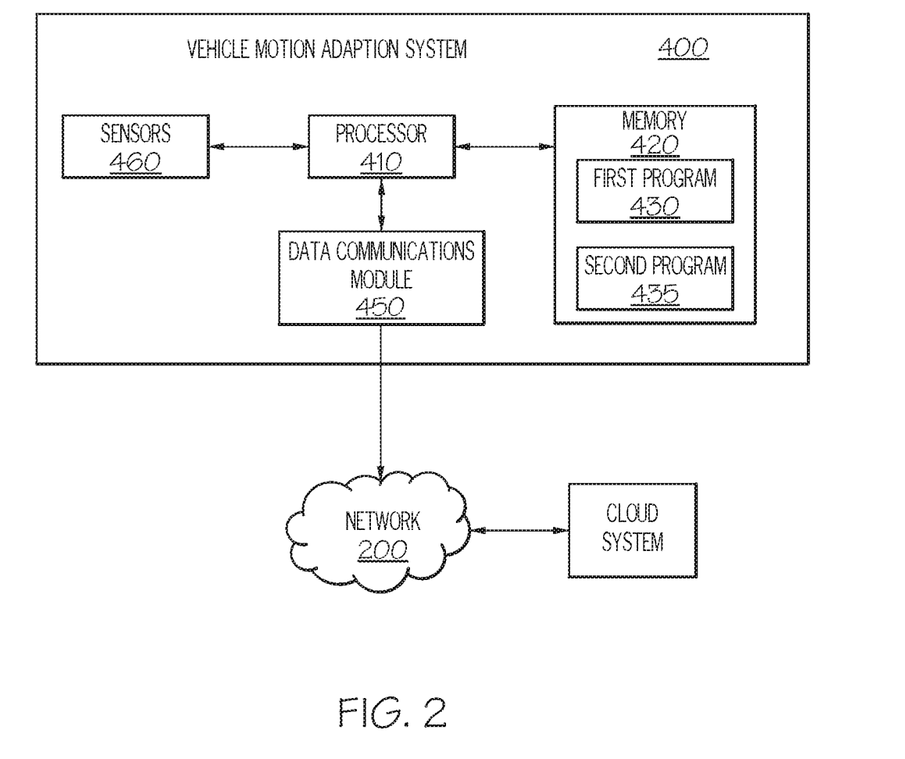
FIG. 2 schematically depicts a block diagram of a vehicle motion adaptation system according to one or more embodiments shown and described herein.

Referring to FIG. 2, the structure and operation of a vehicle motion adaptation system 400 according to one or more embodiments are shown and described herein. In some embodiments, the vehicle motion adaptation system 400 may be implemented in the head unit 120 as shown in FIG. 1. In other embodiments, the vehicle motion adaptation system 400 may be implemented, independently of and separately from the head unit 120.

The structure and operation of the vehicle motion adaptation system 400 are explained in detail. The vehicle motion adaptation system 400 includes a processor 410, a memory 420, a data communication module 450, and sensors 460. The sensors 460 are mounted in or around a vehicle and capture various data streams or data points. The sensors 460 are connected to the processor 410 via a CAN bus (not shown). The data communication module 450 is connected to other systems such as a cloud across the network 200. As shown in FIG. 1, the data communication unit 450 is communicatively connected to the various edge servers 220, 240 and 260, the receivers 280, 285 and/or the central server 300. The vehicle 100 may communicate via a WiFi network, a cellular network, a near field network, etc.

FIG. 2 illustrates one processor 410 but the vehicle motion adaptation system 400 may not be limited to one processor. Two or more processors may be arranged in the vehicle motion adaptation system 400. Relevant factors such as the amount of data points, system cost, vehicle structures, etc. may be considered in determining a number of processors. The positioning and arrangement of processors within a vehicle may be determined to reduce or minimize any data latency and data lag.

As shown in FIG. 2, the memory 420 includes a first program 430 having an onboard storage algorithm and a second program 435 having a machine learning program. In other embodiments, the first program 430 and the second program 435 may be implemented as a single program file, or three or more program files. In some embodiments, the first program 430 and the second program 435 may correspond to two different logics. In other embodiments, the first program 430 and the second program 435 may be implemented as a single logic. Upon execution by the processor 410, the first program 430 is configured to determine whether one or more data streams or data points from the sensors 460 are to be stored on board, or to be transmitted over the network 200 to a cloud system. Upon execution by the processor 410, the second program 435 is configured to identify a driving event and determine relevant responses to the identified driving event. In determining the relevant responses, the second program 435 may base the determination on the data streams or data points stored on board.

Figure 3:
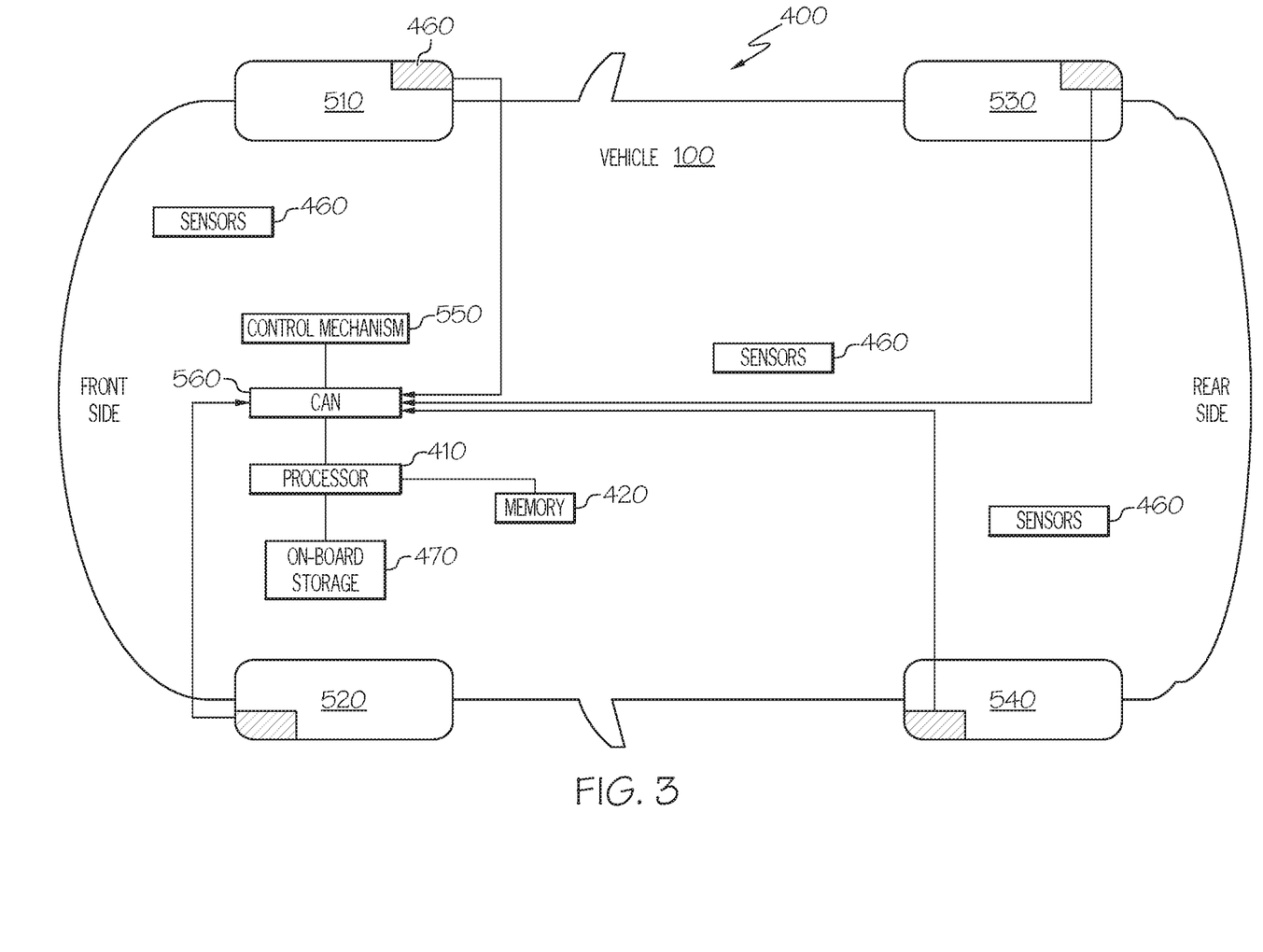
FIG. 3 schematically depicts a system configuration of the vehicle motion adaptation system of FIG. 2 according to one or more embodiments shown and described herein.

FIG. 3 schematically depicts a system configuration of a vehicle motion adaptation system 400 according to one or more embodiments shown and described herein. As shown in FIG. 3, a vehicle 100 includes a front side and a rear side along with four wheels 510, 520, 530 and 540. In other embodiments, the vehicle 500 may not be limited to four wheels and have more or fewer wheels. As shown in FIG. 3, the sensors 460 are arranged in or around the vehicle 500. For instance, the sensors 460 may be located in the wheel 520 of the vehicle 500.

Although not shown in FIG. 3, the vehicle 500 includes various types of sensors 460 at various locations. For example, the sensors include a camera, a pressure sensor, a passenger seat sensor, a front sensor, a rear sensor, an accelerometer, a speed sensor, a pretensioner, a brake sensor, etc. The processor 410 is configured to receive data from those sensors and control overall functions and operations of the vehicle 500. Sensor numbers and sensor locations are not limited to the arrangements depicted in FIG. 3 and various modifications are available. The vehicle motion adaptation system 400 further includes a control mechanism 550 which controls motions of the vehicle such as motions of wheels 510, 520, 530 and 540, movement of other vehicle components such as airbags, doors, windows, a steering wheel, components that control acceleration, deceleration, the speed of the vehicle 100, etc. The vehicle motion adaptation system 400 includes an on board storage 470 that stores vehicle data, such as sensor data, media files, etc. In some embodiments, the on board storage 470 may include a hard drive, a solid state storage device, etc. The vehicle motion adaptation system 400 further includes a controller added network (CAN) bus 560. The CAN bus 560 operates as a communication interface among various components of the vehicle 100 such as the processor 410, the memory 420, the control mechanism 550, and the sensors 460.

Figure 4:
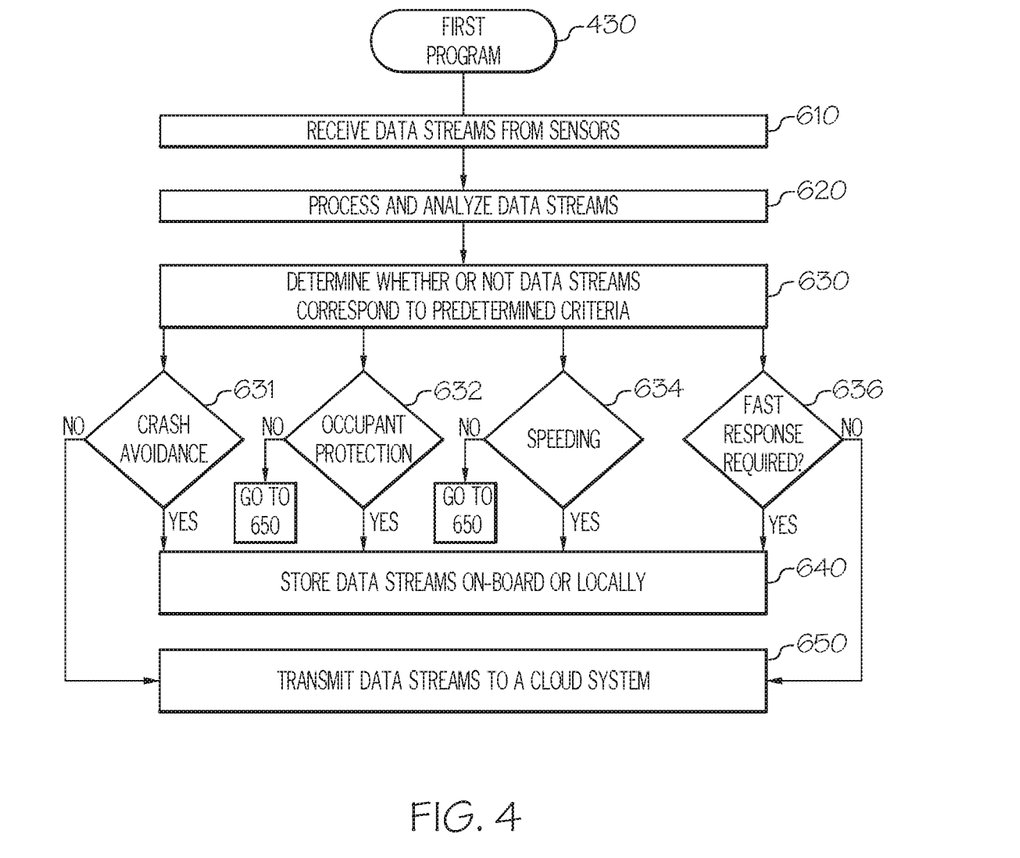
FIG. 4 depicts a flow chart of selectively storing data streams on board or locally according to one or more embodiments shown and described herein.

Referring to FIG. 4, the on board storage algorithm implemented in the first program 430 is discussed. The processor 410 executes the first program 430 to determine whether or not one or more data streams are to be stored on board (i.e., locally), or not. The processor 410 receives data streams from the sensors 460. (Step 610). The sensors 460 continuously capture and generate data streams while the vehicle 500 is operating. For example, the data streams include video data captured by a camera installed in the vehicle 500, acceleration information captured by an accelerometer, braking information captured by a brake sensor, speed information captured by a speed sensor, engine information captured by various sensors arranged with a vehicle engine, etc.

Once the data streams are received, the processor 410 processes and analyzes the data streams. (Step 620). Upon analysis, the processor 410 determines whether the data streams correspond to predetermined criteria. (Step 630). In some embodiments, the predetermined criteria include whether the data streams indicate crash avoidance information, such as automatic braking, automatic collision avoidance, etc. (Step 631). Additionally, or alternatively, the predetermined criteria further include whether the data streams indicate occupant protection (Step 632), or speeding beyond a predetermined threshold limit (Step 634). In other embodiments, the predetermined criteria also include whether on board storage is sufficient or not. In addition, the predetermined criteria includes whether the data streams indicate events that require fast response. (Step 636). The predetermined criteria described here are by way of example only and the vehicle motion adaptation system is not limited thereto.

Once the processor 410 determines that the data streams correspond to the predetermined criteria (e.g., YES determination at any of Steps 631, 632, 634, and 636), then the data streams are stored in the memory 420. (Step 640). If the processor 410 does not determine that the data streams correspond to the predetermined criteria (e.g., NO determination at any of Steps 631, 632, 634, and 363), then the processor 410 may transmit the data streams to a cloud server (Step 650).

In some embodiments, the first program 430 may be implemented with a machine language program, a learned network program, an artificial intelligence program, a pattern recognition program, etc. The first program 430 may not be limited thereto and various other programs may be available.

Figure 5:
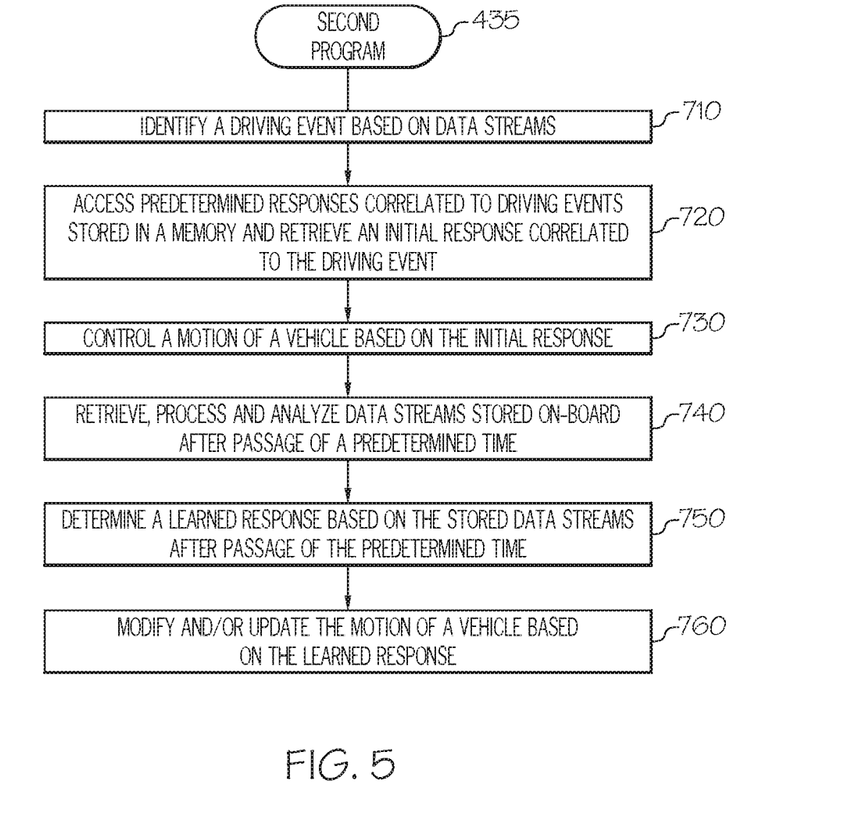
FIG. 5 depicts a flow chart of providing a response to a driving event using on board stored data streams according to one or more embodiments shown and described herein.

FIG. 5 depicts a flow chart of the second program 435 executing a machine language algorithm according to one or more embodiments described herein. In some embodiments, the processor 410 executes the second program 435 based on the stored data on board. Additionally, the processor 410 may use data streams received from a cloud system and/or data streams generated by the sensors 460.

More specifically, the processor 410 receives data streams from sensors and/or a cloud. The processor 410 processes and analyzes the received data streams. As discussed above in connection with FIG. 3, the processor 410 determines whether the received data streams are to be stored on board, or transmitted over the network to a cloud as indicated in the flow chart of FIG. 5. The processor 410 then identifies a driving event based on the received data streams. (Step 710).

In some embodiments, the driving event may include emergency situations. Exemplary emergency situations may include events that take place in a very short time and may result in some emergent action required by vehicle occupants, pedestrians, and/or other persons. Example emergency situations include, but are not limited to, a child jumping in front of a moving vehicle, a deer crashing into a moving vehicle, a vehicle sliding on a slippery surface, a vehicle occupant trying to open a car door without knowing another vehicle is approaching in proximity to the car door, etc. In other embodiments, the driving event may include non-emergency situations that require vehicle responses to avoid accidents. For instance, the driving event may include speeding, a minor collision, etc The driving events may include events that potentially lead to accidents involving injuries of occupants and pedestrians and/or damage to vehicles along with actual accidents. Vehicle responses may facilitate avoiding or mitigating chances of having such situations by controlling a motion of a vehicle. Vehicle responses may further address accident situations. For instance, vehicle responses may include stopping a vehicle, reducing driving speed, controlling a vehicle component such as a door, a window, etc., switching a manual control to an automatic control in case of a driver's lack of response, etc.

As discussed above, upon execution by the processor 410, the second program 435 is configured to identify a driving event and determine relevant responses to the identified driving event. (Step 710). Once the driving event is identified, the processor 410 accesses predetermined responses stored in the memory 420. (Step 720). The predetermined responses are correlated to driving events and stored in the memory. The predetermined responses may dictate motions of a vehicle corresponding to driving events. For instance, a predetermined response for speeding may include reducing driving speed and a predetermined response for a minor collision may include immediately stopping a vehicle or slowing down a driving speed. As another example, a predetermined response for spotting an object within a certain boundary of surroundings may include controlling a vehicle to a stop immediately.

The processor 410 accesses the predetermined response correlated to the driving event and retrieves an initial vehicle response to the driving event. (Step 720). The processor 410 controls relevant control mechanisms 550 (shown in FIG. 3) and controls a motion of the vehicle based on the initial vehicle response. (Step S730). In some embodiments, the processor 410 controls the vehicle to reduce speed, pull to a stop, swerve into a next lane to avoid a front located car, swerve to avoid a nearby object, etc. Controlling the motion of the vehicle may not be limited thereto and involve controlling various motions of the vehicle that are currently available. In some embodiments, the control of the motion of the vehicle may be performed directly by the processor 410 and the control mechanism 550. In that case, the control of the motion of the vehicle may be available and particularly useful with autonomous vehicles. Alternatively, or additionally, the control of the motion of the vehicle may be manually performed by delivering a notification or warning message to a driver.

The processor 410 retrieves the on board stored data streams and processes and analyzes the data streams after passage of a predetermined time. (Step 740). In some embodiments, the predetermined time is preset and may involve a very short amount of time to reflect any update on the driving condition and the motion of the vehicle. Data streams at each passage of the predetermined time may serve as multiple reference points for the processor 410 to consider. The processor 410 follows multiple checks on multiple references points set up in the vehicle motion adaptation system 400. The processor 410 determines a learned response based on the stored data streams at multiple reference points. (Step 750).

In some embodiments, the learned response may reflect more actual and accurate situations of the driving event. The data streams on which the initial response is based may vary or change at different multiple reference points. For instance, the data streams may indicate speeding, but after passage of certain time, subsequent data streams may not indicate speeding beyond a predetermined speed limit any longer. In that case, the initial response may include reducing the driving speed if speeding conditions last for next 3 minutes. The learned response may be different from the initial response after continuously checking and monitoring the next 3 minutes, for example, at multiple reference points. In other words, the learned response may be no speeding as the speed of the vehicle at multiple reference points may be lower than a threshold speed. Based on the learned response, the processor 410 modifies and/or updates the motion of the vehicle such that the motion of reducing the driving speed may be discontinued. (Step 760). In other embodiments, the learned response may be confirmation of the speeding of the vehicle and in that case, the motion of the vehicle may be updated to adjust the speed reduction amount of the vehicle 100.

Figure 6:
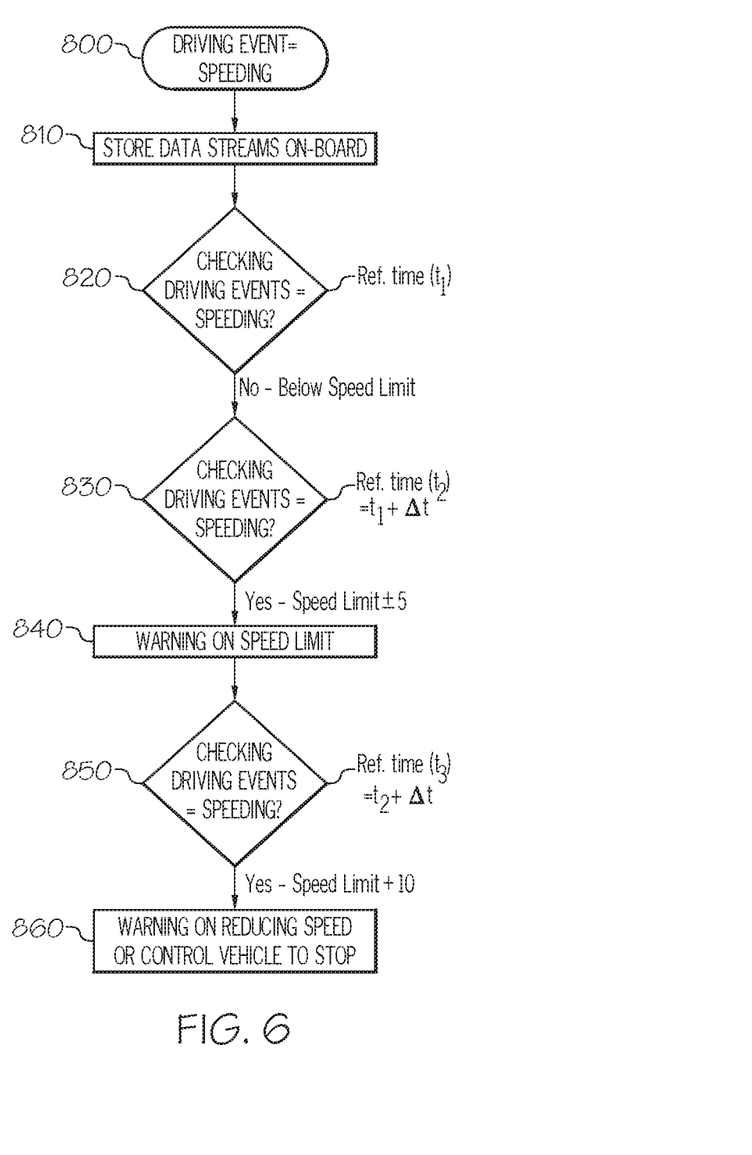
FIG. 6 depicts a first use case of providing a response to a speeding driving event by using the algorithm depicted in FIGS. 4 and 5 according to one or more embodiments shown and described herein.
Figure 7:
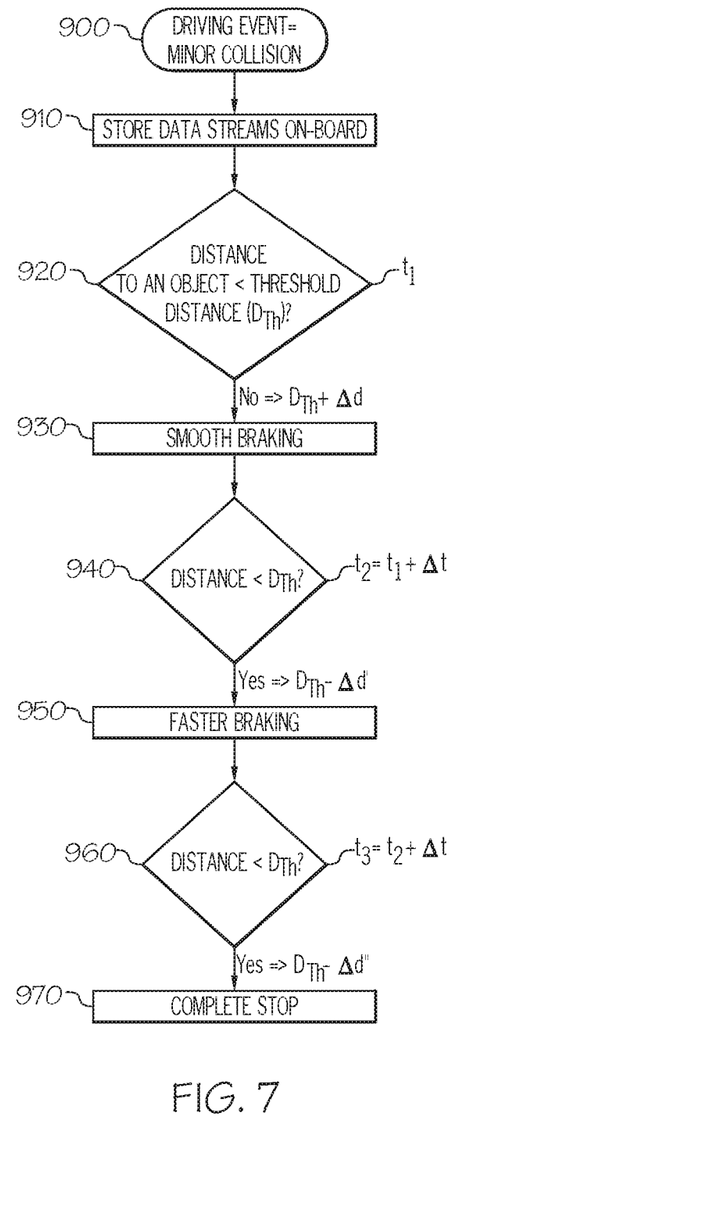
FIG. 7 depicts a second use case of providing a response to a minor collision driving event by using the algorithm depicted in FIGS. 4 and 5 according to one or more embodiments shown and described herein.
Figure 8:
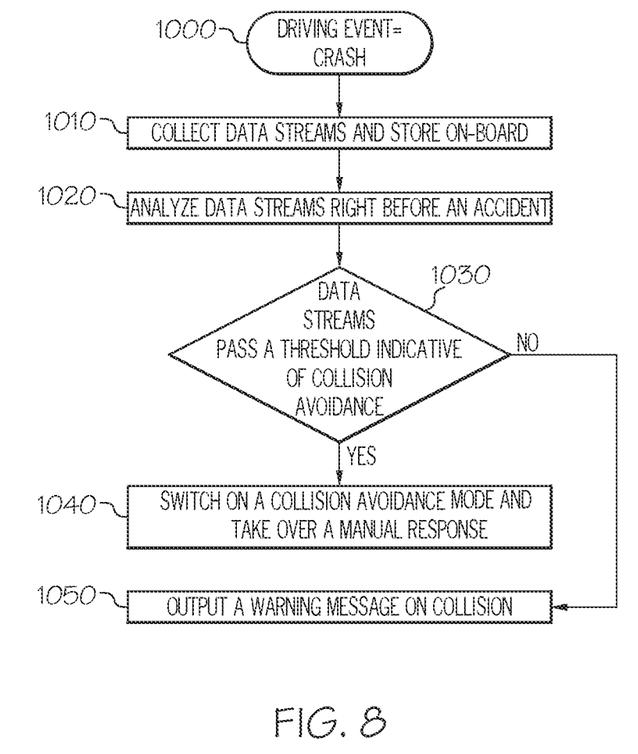
FIG. 8 depicts a third use of providing a response to a crash driving event by using the algorithm depicted in FIGS. 4 and 5 according to one or more embodiments shown and described herein.

FIGS. 6-8 depict use cases of the learned response and vehicle motion adaptations by the vehicle motion adaptation system and method described herein. The use cases as shown in FIGS. 6-8 are by way of example only and the vehicle motion adaptation system and method may not be limited thereto.

FIG. 6 depicts an exemplary use case where a driving event is or involves speeding. (Step 800). The processor 410 receives and analyzes data streams and determines whether data streams are to be stored on board. As shown in FIG. 4, the processor 410 determines that the data streams are indicative of information relating to speeding and stores the data streams on board. (Step 810). The data streams may be considered as indicating other information and the processor 410 may analyze the data streams for the purpose of determining on board storage or transmission to a cloud. The processor 410 identifies that the driving event is directed to speeding at a reference time ($t_1$). (Step 820). At the reference time ($t_1$), the processor 410 determines no speeding as the detected speed of the vehicle is below a predetermined speed limit. (Step 820). The processor 410 continues to monitor the driving event by analyzing the data streams at multiple reference points.

The processor 410 checks the driving event at a next reference point ($t_2$, where $t_2=t_1+\Delta t$), and determines that the driving speed of the vehicle is above speed limit±5 mph. The processor 410 then determines an initial response such as outputting a warning or notification indicative of speeding over a particular speed limit. (Step 840). Such warning or notification may be displayed visually or may be an audio output warning. The processor 410 further checks the driving event at a next reference point ($t_3$, where $t_3=t_2+\Delta t$). (Step 850). The processor 410 determines the driving speed of the vehicle is more than 10 mph above speed limit. The processor 410 confirms that the driving event is speeding and determines a learned response based on the data streams at $t_3$. (Step 850). The processor 410 provides the learned response, including outputting a warning or notification such as "REDUCE SPEED", or alternatively, or additionally, controlling the motion of the vehicle to reduce speed or stop if such option may be available and feasible. (Step 860).

As shown in FIG. 6, the motion of the vehicle may be controlled to be changed, or updated by reflecting data points at the different data points. In other words, the motion of the vehicle may be adapted to reflect the actual situations of the driving event at the multiple data points. Referring back to FIG. 3, the processor 410 is operable to be in communication with the control mechanism 550 and the sensors 460 via the CAN bus 560 and configured to control components relating to braking, rotation of the wheels 510, 520, 530 and 540, change of direction, speed up, speed down, etc. In some embodiments, the control of the motion of the vehicle may be performed directly by the processor 410 and the control mechanism 550. In that case, the control of the motion of the vehicle may be available and particularly useful with autonomous vehicles. Alternatively, or additionally, the processor 410 is operable to control a display device to display the warning or notification such as "REDUCE SPEED." Drivers may see the warning or notification and take necessary actions to control the motion of the vehicle accordingly. As another example, the processor 410 may be operable to control the control mechanism 550 in order to control an acceleration amount, or a deceleration amount of the motion of the vehicle.

FIG. 7 depicts an exemplary use case where a driving event is or involves a minor collision. (Step 900). The processor 410 receives and analyzes data streams and determines whether data streams are to be stored on board. As shown in FIG. 4, the processor 410 determines that the data streams are indicative of information relating to a minor collision and stores the data streams on board. (Step 910). The data streams may be considered as indicating other information and the processor 410 may analyze the data streams for the purpose of determining on board storage or transmission to a cloud. The processor 410 then identifies that the driving event is directed to a minor collision at a reference time ($t_1$). (Step 920). In particular, the processor 410 determines whether or not a distance between two adjacent vehicles is smaller than a threshold distance ($D_{Th}$) at the reference time ($t_1$). (Step 920). The processor 410 determines that the distance of the vehicle is not smaller than the threshold distance ($D_{Th}$), such as $D_{Th}+\Delta d$ at the reference time ($t_1$). (Step 920). The processor 410 then determines an initial response such as controlling the motion of the vehicle (e.g., by performing smooth braking). (Step 930). Additionally, or alternatively, a warning or notification that the distance to a car head is decreasing may be displayed visually or may be output as an audio output warning.

Referring back to FIG. 3, the processor 410 is operable to be in communication with the control mechanism 550 and the sensors 460 via the CAN bus 560 and configured to control components relating to braking, rotation of the wheels 510, 520, 530 and 540, change of direction, speed up, speed down, etc. In some embodiments, the control of the motion of the vehicle may be performed directly by the processor 410 and the control mechanism 550. In that case, the control of the motion of the vehicle may be available and particularly useful with autonomous vehicles. In some embodiments, the control of the motion of the vehicle may be performed directly by the processor 410 and the control mechanism 550. In that case, the control of the motion of the vehicle may be available and particularly useful with autonomous vehicles. Alternatively, or additionally, the processor 410 is operable to control a display device to display the warning or notification such as "AVOID COLLISION AGAINST A CAR AT THE FRONT." Drivers may see the warning or notification and take necessary actions to control the motion of the vehicle accordingly. As further another example, the processor 410 may be operable to control the control mechanism 550 in order to control an acceleration amount, or a deceleration amount of the motion of the vehicle.

The processor 410 continues to monitor the driving event by analyzing the data streams at multiple reference points. The processor 410 checks the driving event at a next reference point ($t_2$, where $t_2=t_1+\Delta t$), and determines again whether or not the distance of the vehicle is smaller than the threshold distance ($D_{Th}$). (Step 940). This time the processor 410 determines that the distance is smaller than the threshold distance ($D_{Th}$) such as $D_{Th}-\Delta d'$. (Step 940). The processor 410 analyzes the data streams and provides a learned response based on the on board stored data. In some embodiments, the learned response determined by the processor 410 may include faster braking to avoid a minor collision. (Step 950). Accordingly, the motion of the vehicle may be controlled to be changed, or updated by reflecting data points at the second reference point ($t_2$, where $t_2=t_1+\Delta t$). In other words, the motion of the vehicle may be adapted to reflect the actual situations of the driving event at the second data point.

The processor 410 further checks the driving event at a next reference point ($t_3$, where $t_3=t_2+\Delta t$). (Step 960). The processor 410 determines the distance between the two adjacent cars is much less than the threshold distance ($D_{Th}$) (i.e., $D_{Th}-\Delta d''$). The processor 410 confirms that the driving event is a minor collision and determines a learned response based on the data streams at $t_3$. The processor 410 provides the learned response, including completely stopping the vehicle. (Step 970). Accordingly, the motion of the vehicle may be controlled to be changed, or updated by reflecting data points at the third reference point ($t_3$, where $t_3=t_2+\Delta t$). In other words, the motion of the vehicle may be adapted to reflect the actual situations of the driving event at the third data point.

Referring back to FIG. 3, the processor 410 is operable to be in communication with the control mechanism 550 and the sensors 460 via the CAN bus 560 and configured to control components relating to braking, rotation of the wheels 510, 520, 530 and 540, change of direction, speed up, speed down, etc. Alternatively, or additionally, the processor 410 is operable to control a display device to display the warning or notification such as "REDUCE SPEED." As further another example, the processor 410 may be operable to control the control mechanism 550 in order to control an acceleration amount, or a deceleration amount of the motion of the vehicle.

FIG. 8 depicts another exemplary situation where a driving event is, or involves a crash situation. (Step 1000). In some embodiments, data streams relating to a crash, or indicating a situation potentially leading to a crash may be stored on board, as default, at least for a predetermined time before such data streams may be removed from a vehicle. Based on the data streams, the processor 410 may identify that the driving event is related to a crash. The data streams may be analyzed and the driving event of a crash is identified. (Step 1010). The processor 410 may access the memory and retrieves an initial response correlated to the crash. The processor 410 may control the motion of the vehicle based on the initial response. Additionally, or alternatively, a warning or notification of the crash may be displayed visually or may be output as an audio output warning.

The processor 410 continues to monitor the driving event by analyzing the data streams at multiple reference points. The processor 410 confirms that the data streams continuously indicate the crash situation. In particular, the processor 410 checks the data streams right before the crash. (Step 1020). The processor 410 analyzes the data streams and provides a learned response based on the on board stored data. In some embodiments, the processor 410 determines whether or not the data streams pass a threshold indicative of collision avoidance. (Step 1030). For example, the processor 410 determines whether the data streams are indicative of excessive speed that may indicate no possibility of collision avoidance. As another example, the processor 410 determines a distance to an object and the driving speed in order to determine that a vehicle may not avoid crash to the object.

In some embodiments, when the processor 410 determines that the crash situation may not be avoided, the learned response may include switching on a collision avoidance mode. (Step 1040). The collision avoidance mode may enable an automatic control to take over a manual control. The automatic control may enable a vehicle to come to a stop even when a driver or an occupant may be unable to control a vehicle. This response may be helpful where drivers may be injured, unconscious, and/or unavailable to control the motion of the vehicle. In other embodiments, when the processor 410 determines that the crash situation may be avoided, the processor 410 outputs a warning message such as reduce speed of a vehicle, or stop a vehicle. (Step 1050). This response may be more relevant to vehicles driven by drivers who may be available to control the motion of the vehicle but it may not be limited thereto. Alternatively, or additionally, the processor 410 may control a relevant mechanism of a vehicle to reduce speed, or move into a direction and a space where an object may be avoided. This response may be useful with autonomous vehicles but it may not be limited thereto. As shown in FIG. 8, the motion of the vehicle may be controlled to be changed, or updated by reflecting data points at the different data points involving a crash or collision. In other words, the motion of the vehicle may be adapted to reflect the actual situations of the driving event at the multiple data points.

Referring back to FIG. 3, the processor 410 is operable to be in communication with the control mechanism 550 and the sensors 460 via the CAN bus 560 and configured to control components relating to braking, rotation of the wheels 510, 520, 530 and 540, change of direction, speed up, speed down, etc. Alternatively, or additionally, the processor 410 is operable to control a display device to display the warning or notification such as "REDUCE SPEED." As further another example, the processor 410 may be operable to control the control mechanism 550 in order to control an acceleration amount, or a deceleration amount of the motion of the vehicle.

As discussed above, in some embodiments, the processor determines responses correlated to driving events stored in the memory and retrieves an initial response correlated to the driving event. Then the motion of the vehicle is controlled based on the initial response. In some embodiments involving autonomous vehicles, the control of the motion of the vehicle may be performed directly by the processor and the control mechanism. Alternatively, or additionally, the processor is operable to control a display device to display relevant warning or notification reflecting the initial response. Then drivers may see the warning or notification and take necessary actions to control the motion of the vehicle accordingly.

In some embodiments, a vehicle motion adaptation system includes a processor and a memory coupled to the processor and storing a machine learning program. The machine learning program, upon execution by the processor, performs at least the following operations of (i) determining a selective set of data points to be stored on board, (ii) storing the selected set of data points based on the determination, (iii) determining a learned response to one or more driving events based on the selected set of data points stored onboard, and (iv) adapting a motion of a vehicle based on the learned response.

In another embodiment, the operation of determining the selective set of data points further includes determining whether the selective set of data points are indicative of braking, collision avoidance, speeding or a combination thereof.

In another embodiment, the operation of storing the selected set of data points further includes storing the selected set of data points on board instead of transmitting the selective set of data points to a cloud computing system.

In another embodiment, the machine learning program further performs determining an initial response to the one or more driving events based on the selective set of data points stored on board.

In further another embodiment, the selected set of data points includes a first set of data points obtained after elapse of a predetermined time from the time of determining the initial response. The operation of determining the learned response further includes (i) updating, or modifying the initial response based on the first set of data points, and (ii) outputting a first response based on the update or the modification.

In further another embodiment, the operation of adapting the motion of the vehicle further includes adapting the motion of the vehicle based on the first response.

In further another embodiment, the selected set of data points includes a second set of data points obtained after elapse of the predetermined time or another predetermined time from the first set of data points. The operation of determining the learned response further includes (i) updating, or modifying the first response based on the second set of data points, and (ii) outputting a second response based on the update or the modification.

In further another embodiment, the operation of adapting the motion of the vehicle further includes adapting the motion of the vehicle based on the second response.

In further another embodiment, the vehicle motion adaptation system further includes an on board storage device for storing the selected set of data points.

In some embodiments, a vehicle motion adaptation system includes one or more sensors mounted in or around a vehicle, a processor coupled to the sensors and operable to receive one or more data streams, and a memory coupled to the processor and storing information indicative of one or more predetermined motions of the vehicle associated with one or more driving events. The vehicle motion adaptation system further includes machine readable instructions stored in the memory and upon execution by the processor, performing at least the following operations including (i) storing the one or more data streams locally, (ii) identifying a selected driving event based on the one or more data streams, (iii) determining an initial motion correlated to the selected driving event by accessing the information indicative of the one or more predetermined motions of the vehicle, (iv) determining a learned response to the selected driving event based on the one or more data streams, and (v) adapting a motion of a vehicle based on the learned response with respect to the selected driving event.

In another embodiment, the machine readable instructions, upon execution by the processor, further perform the operations including (i) determining whether or not the one or more data streams correspond to a predefined set of data streams to be stored locally instead of transmitted to a cloud system, and (ii) upon determination that the one or more data streams correspond to the predefined set of data streams, storing the one or more data streams locally.

In another embodiment, the one or more sensors generate a first data stream and a second data stream after passage of a predetermined time. The operation of determining the learned response further includes (i) determining the learned response based on the first data stream, and (ii) determining the learned response based on the second data stream.

In further another embodiment, the operation of adapting the motion of the vehicle further includes (i) updating the motion of vehicle based on the learned response associated with the first data stream, and (ii) further updating the motion of the vehicle based on the learned response associated with the second data stream.

In further another embodiment, the operation of adapting the motion of the vehicle further includes converting a manual control of the motion of the vehicle to an automatic control.

In some embodiments, a vehicle motion adaptation method includes the steps of (i) determining, with a processor, a selective set of data points to be stored on board, (ii) storing the selected set of data points based on the determination, (iii) identifying, with the processor, a selected driving event based on the selective set of data points, (iv) determining an initial motion correlated to the selected driving event by accessing the information indicative of one or more predetermined motions of the vehicle stored in a memory, (v) determining a learned response to one or more driving events based on the selected set of data points stored onboard, and (vi) adapting a motion of a vehicle based on the learned response.

In another embodiment, the vehicle motion adaptation method further includes (i) determining whether or not the one or more data points correspond to a predefined set of data streams that is to be stored locally instead of transmitted to a cloud system, and (ii) upon determination that the one or more data streams correspond to the predefined set of data streams, storing the one or more data streams locally.

In further another embodiment, the vehicle motion adaptation method further includes generating, with one or more sensors, a first data stream and a second data stream after passage of a predetermined time.

In further another embodiment, the step of determining the learned response further includes (i) determining the learned response based on the first data stream, and (ii) determining the learned response based on the second data stream.

In further another embodiment, the step of adapting the motion of the vehicle further includes (i) updating the motion of vehicle based on the learned response associated with the first data stream, and (ii) further updating the motion of the vehicle based on the learned response associated with the second data stream. In further another embodiment, the step of adapting the motion of the vehicle further includes converting a manual control of the motion of the vehicle to an automatic control.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle motion adaptation system, comprising:
a memory coupled to a processor and storing a machine learning program that, upon execution by the processor, performs at least:
receiving a first set of data points from one or more vehicle sensors on board a vehicle;
determining whether the first set of data points satisfy a predetermined criteria;
upon determination that the first set of data points satisfy the predetermined criteria, storing the first set of data points in the memory;
upon determination that the first set of data points do not satisfy the predetermined criteria, transmitting the first set of data points to a remote computing device;
identifying a driving event based on the first set of data points;
determining an initial response to the driving event based on the first set of data points;
adapting a motion of the vehicle based on the initial response;
receiving a second set of data points from the one or more vehicle sensors;
determining a learned response to the driving event based on the second set of data points; and adapting a motion of the vehicle based on the learned response.

2. The system of claim 1, wherein the machine learning program further causes the processor to determine whether the first set of data points are indicative of braking, collision avoidance, speeding or a combination thereof.

3. The system of claim 1, wherein the second set of data points is obtained after elapse of a predetermined time from the time of determining the initial response.

4. The system of claim 3, wherein determining the learned response further comprises updating or modifying the initial response.

5. The system of claim 1, further comprising an on board hard drive for storing the first set of data points.

6. A vehicle motion adaptation system, comprising:
one or more sensors mounted in or around a vehicle;
a processor coupled to the sensors and operable to receive one or more data streams from the sensors;
a memory coupled to the processor and storing information indicative of one or more predetermined motions of the vehicle associated with one or more driving events;
machine readable instructions stored in the memory and upon execution by the processor, performing at least:
determining whether each of the one or more data streams satisfy a predetermined criteria:
storing each of the one or more data streams that satisfy the predetermined criteria locally;
transmitting each of the one or more data streams that do not satisfy the predetermined criteria to a remote computing device;
identifying a selected driving event based on the one or more data streams;
determining an initial motion correlated to the selected driving event by accessing the information indicative of the one or more predetermined motions of the vehicle;
determining a learned response to the selected driving event based on the one or more data streams; and
adapting a motion of the vehicle based on the learned response with respect to the selected driving event.

7. The system of claim 6, wherein:
the one or more sensors generate a first data stream and a second data stream after passage of a predetermined time; and
determining the learned response further comprises:
determining the learned response based on the first data stream and the second data stream.

8. The system of claim 7, wherein adapting the motion of the vehicle comprises:
updating the motion of the vehicle based on the learned response associated with the first data stream and the second data stream.

9. The system of claim 6, wherein adapting the motion of the vehicle comprises converting a manual control of the motion of the vehicle to an automatic control.

10. A vehicle motion adaptation method, comprising:
receiving, with a processor, a first set of data points from one or more vehicles sensors on board a vehicle;
determining whether the first set of data points satisfy a predetermined criteria;
upon determination that the first set data points satisfy the predetermined criteria, storing the first set of data points in a memory on board the vehicle;
upon determination that the first set of data points do not satisfy the predetermined criteria, transmitting the first set of data points to a remote computing device;
identifying, with the processor, a selected driving event based on the first set of data points;
determining an initial motion correlated to the selected driving event by accessing one or more predetermined motions of the vehicle stored in a memory;
receiving a second set of data points from the one or more vehicle sensors;
determining a learned response to one or more driving events based on the second set of data points; and
adapting a motion of the vehicle based on the learned response.

11. The method of claim 10, further comprising:
generating, with one or more sensors, a first data stream and a second data stream after passage of a predetermined time.

12. The method of claim 11, wherein the learned response is determined based on the first data stream and the second data stream.

13. The method of claim 12, wherein adapting the motion of the vehicle comprises:
updating the motion of the vehicle based on the learned response.

14. The method of claim 10, wherein adapting the motion of the vehicle comprises converting a manual control of the motion of the vehicle to an automatic control.

* * * * *

UNITED STATES PATENT AND TRADEMARK OFFICE
CERTIFICATE OF CORRECTION

PATENT NO. : 11,294,381 B2
APPLICATION NO. : 16/198440
DATED : April 5, 2022
INVENTOR(S) : Joshua V. Marasigan It is certified that error appears in the above-identified patent and that said Letters Patent is hereby corrected as shown below:

In the Claims

In Column 15, Line(s) 27, Claim 6, after "criteria", delete ":" and insert --;--, therefor.

Signed and Sealed this
Seventeenth Day of May, 2022

Katherine Kelly Vidal
*Director of the United States Patent and Trademark Office*